Figure 1:
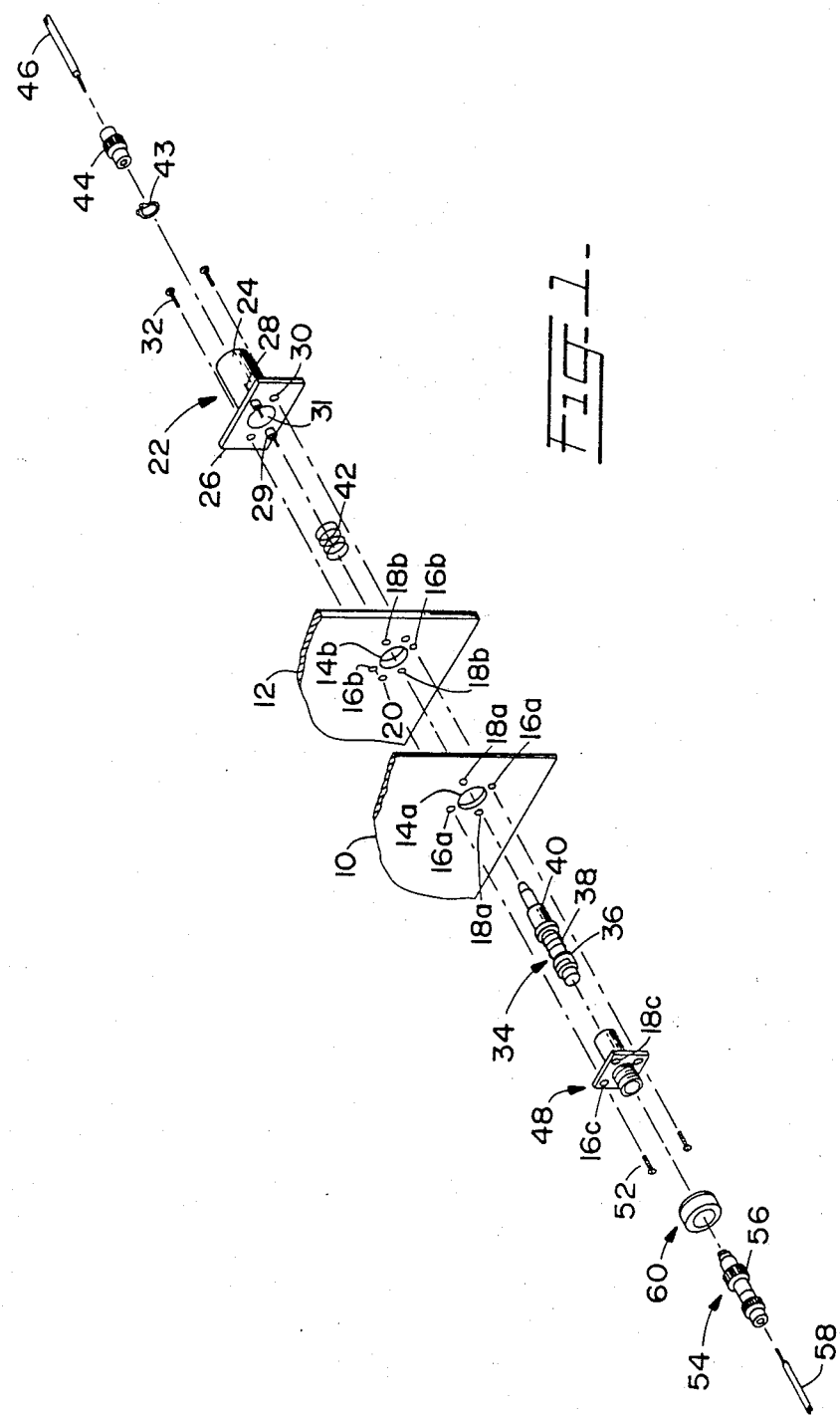

United States Patent [19]

Schmachtenberg, III

[11] Patent Number: 4,549,783
[45] Date of Patent: Oct. 29, 1985

[54] CONNECTOR FOR OPTICALLY CONNECTING AN ELECTRICALLY-ENERGIZABLE LIGHT SOURCE TO AN OPTICAL FIBER

[75] Inventor: Richard Schmachtenberg, III, Beaverton, Oreg.

[73] Assignee: Tektronix, Inc., Beaverton, Oreg.

[21] Appl. No.: 482,732

[22] Filed: Apr. 6, 1983

[51] Int. Cl.⁴ ................................................. G02B 7/26
[52] U.S. Cl. ................................ 350/96.20; 350/96.21
[58] Field of Search ............... 350/96.20, 96.21, 96.22; 339/19

[56] References Cited

U.S. PATENT DOCUMENTS

| | | | |
|---|---|---|---|
| 3,942,859 | 3/1976 | Korodi | 350/96.23 X |
| 4,081,208 | 3/1978 | Meade | 350/96.20 |
| 4,152,043 | 5/1979 | Albanese | 350/96.20 |
| 4,294,512 | 10/1981 | Logan | 350/96.20 |
| 4,303,301 | 12/1981 | Teichert et al. | 350/96.18 |
| 4,312,563 | 1/1982 | Mead | 350/96.20 |
| 4,465,333 | 8/1984 | Caserta et al. | 350/96.20 |

FOREIGN PATENT DOCUMENTS

| | | | |
|---|---|---|---|
| 2810715 | 9/1979 | Fed. Rep. of Germany | 350/96.14 |
| 45052 | 3/1980 | Japan | 350/96.21 |
| 2099254 | 12/1982 | United Kingdom | 350/96.20 |

Primary Examiner—William L. Sikes
Assistant Examiner—Frank González
Attorney, Agent, or Firm—John Smith-Hill; Francis I. Gray

[57] ABSTRACT

An optical connector comprises first and second mating coupling members. The first member has two conductive terminal portions for connection to a driver circuit for a light emitting element, and the second member has a conductive portion which contacts the two terminal portions when the first and second members are coupled together for establishing electrical connection between the terminal portions.

10 Claims, 3 Drawing Figures

CONNECTOR FOR OPTICALLY CONNECTING AN ELECTRICALLY-ENERGIZABLE LIGHT SOURCE TO AN OPTICAL FIBER

This invention relates to optical connectors, more particularly to optical connectors suitable for use in an optical communication testing instrument.

BACKGROUND OF THE INVENTION

Recently, optical communication testing instruments, such as the fiber optic time domain reflectometer (OTDR), have been used for evaluating various characteristics of an optical fiber. In the OTDR, an output pulse of infrared light is emitted from a receptacle provided on the front panel of the instrument. A plug with an optical fiber to be tested is coupled to the receptacle. It is well known that infrared light is harmful to the human eye. Accordingly, the operator of the instrument has to take care to avoid exposure of his eyes to the infrared light when the plug is not coupled to the receptacle. Some optical communication testing instruments have covers for the receptacles. However, it is troublesome to remove and replace the cover each time the plug is connected to and disconnected from the receptacle.

SUMMARY OF THE INVENTION

According to the present invention there is provided an optical connector, comprising first and second mating coupling members, said first member having two conductive terminal portions for connection to a driver circuit for a light emitting element and said second member having a conductive portion which contacts the two terminal portions when the first and second members are coupled together for establishing electrical connection between said terminal portions.

Figure 2:
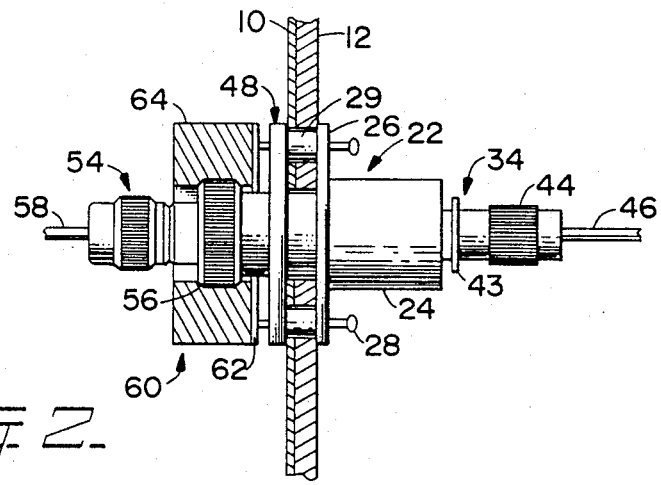
Figure 3:
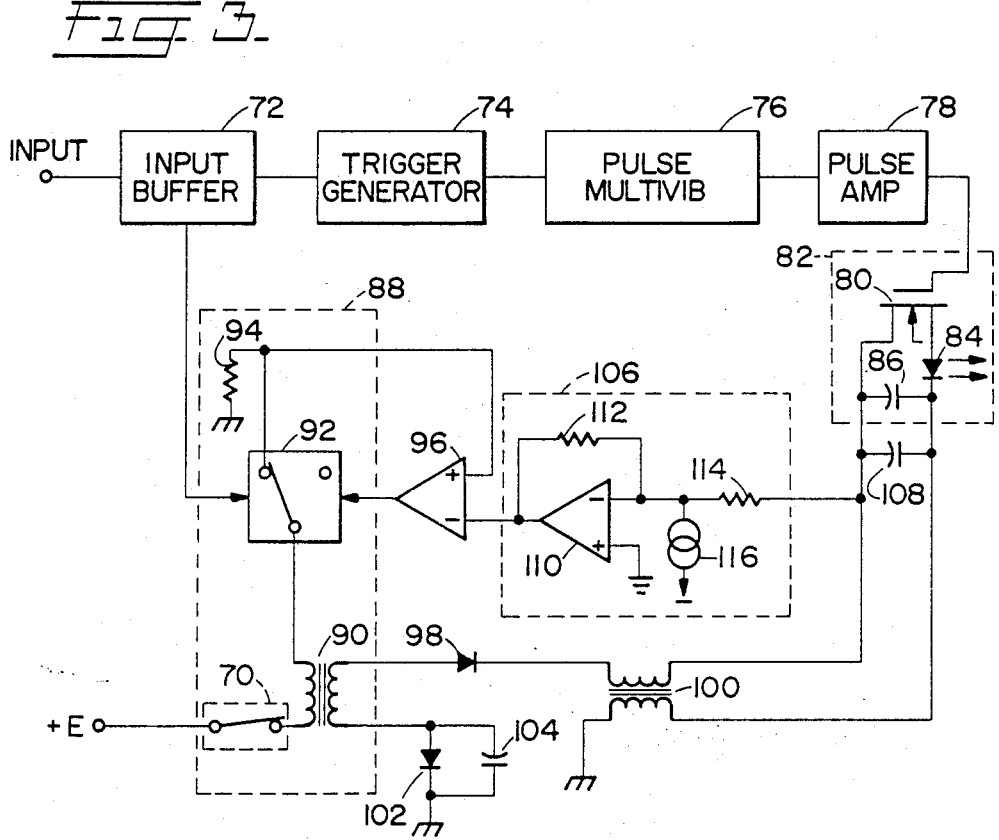

For a better understanding of the invention, and to show how the same may be carried into effect, reference will now be made, by way of example, to the accompanying drawings in which:

FIG. 1 is an exploded fragmentary view of the front panel connector of a fiber optic time domain reflectometer, FIG. 2 is a side view of part of the OTDR shown in FIG. 1, and FIG. 3 is a schematic diagram.

The OTDR shown in FIG. 1 has a front panel 10 formed with an opening 14a whose diameter is slightly larger than the body diameter of a flanged receptacle 48. Surrounding the opening 14a are diagonally disposed pairs of smaller openings 16a and 18a. A subpanel 12 is formed with an opening 14b having substantially the same diameter as the opening 14a, and with pairs of smaller openings 16b and 18b at locations corresponding to the openings 16a and 18a in the panel 10. In addition, the subpanel is formed with a pair of small openings 20 disposed between the openings 16b and 18b. Secured to the rear of the subpanel 12 is a housing 22 that includes a cylindrical body portion 24 having a rectangular flange 26 at one end. The opposite end of the body portion 24 is partially closed by an inwardly-extending flange or rim (not shown), providing a central aperture of reduced diameter. Mounted in the flange 26 is a pair of contact pins 28, which are supported perpendicular to the surface of the flange by post-shaped insulating spacers 29 that project from the front surface of the flange 26 and extend through the openings 18b and 18a in the subpanel and panel, respectively. The contact pins 28 act as fixed electrical contacts of a switch for controlling the optical output of the OTDR, as will be described in greater detail below. The housing 22 is secured to the rear side of the subpanel 12 by a pair of screws 32 extending through mounting holes 30 in the flange 26 to engage the openings 20 in the subpanel.

A plug 34 includes a body 36, a first spring 38, a cylindrical member 40 having a outwardly-projecting rim or flange at the forward end, a second spring 42, a retaining ring 43 and a knurled nut 44. The rear portion of the plug body 36 is threaded for engagement with the nut 44. To assemble the plug 34 with an optical fiber 46, the nut 44 first is loosely screwed onto the threaded portion of the plug body 36. It should be noted that the nut 44 is smaller in diameter than the aperture at the rear of the housing 22. This allows the optical fiber to be inserted into the plug before the plug body is installed in the housing 22. The fiber 46 is fed through the back of the housing 22, then through the spring 42, and is inserted into the plug 34 through the nut 44. With the fiber protruding through the front end of the plug body 36, the nut 44 is tightened and the fiber cleaved to length. The plug assembly is then pulled back into the housing 22 through the openings 14a, 14b and 31, and is held in place by the C-shaped retaining ring 43 placed in the groove between the member 40 and the nut 44.

The receptacle 48 includes a cylindrical body having a threaded forward end, and a flange with openings 16c and 18c corresponding in location with the openings 16a, 16b and 18a, 18b, respectively. A conventional coupling lens (not shown) is mounted within the cylindrical body of the receptacle 48. The receptacle 48 is secured to the panels 10 and 12 by a pair of screws 52, which are threaded into the openings 16b in the subpanel. The coupler formed by the plug 34 and the receptacle 48 is of commercially available form. However, other coupling devices may be used.

A plug 54 includes a plug-front, a nut (like plug 34) and a coupling ring 56. An optical fiber under test 58 is installed in the plug 54 in the same manner as the fiber 46 is installed in the plug 34. A contact ring 60 comprises two annular portions 62 and 64 adhered to each other and having a central hole. The portion 62 is made of metal, while the portion 64 is preferably made of a resilient material such as rubber. The diameter of the central hole of the portion 64 is slightly smaller than the diameter of the coupling ring 56, allowing the coupling ring 56 to be removably secured in the contact ring 60 by deformation of the resilient material. When the plug 54 is coupled to the receptacle 48 by screwing the coupling ring 56 onto the thread of the receptacle 48, the optical fibers 46 and 58 are coupled together optically in the receptacle 48. Simultaneously, the contact ring 62 contacts the contact pins 28, which are connected to a driver circuit for an optical pulse generator. The contact ring 62 acts as a movable contact for a switch having fixed contacts provided by the contact pins 28.

The optical pulse generator circuit comprises an input buffer through which a pulse trigger signal is applied to a trigger generator 74. The trigger generator 74 produces a trigger pulse in response to the negative edge of the pulse trigger signal and applies it to a pulse multivibrator 76 (monostable multivibrator). The pulse multivibrator 76 generates, for example, a 50 ns pulse when triggered. The output pulse of the pulse multivibrator 76 is amplified and buffered by a pulse amplifier 78 and drives the gate of a MOSFET 80 in an optical generator hybrid 82, which also includes a laser diode 84 having its anode connected to the source of the MOSFET 80, and a capacitor 86 connected between the cathode of the laser diode 84 and the drain of the MOSFET 80.

A voltage supply generator 88 comprises the switch, designated 70, formed by the pins 28 and the contact ring 62, a transformer 90, a double throw switch 92 and a resistor 94. One of the fixed contacts of the switch 70 receives supply voltage +E and the other fixed contact is connected to the stationary contact of the double throw switch 92 through the primary winding of the transformer 90. The switch 92 is controlled by the outputs of the input buffer 72 and a comparator to connect the primary winding to ground through the resistor 94 or to disconnect it from ground.

One end of the secondary winding of the transformer 90 is connected to one end of the primary winding of a transformer 100 through a diode 98 disposed in forward direction, while the other end of the secondary winding of transformer 90 is grounded through a parallel circuit of a diode 102 and a capacitor 104. The other end of the primary winding of the transformer 100 is connected to the drain of the MOSFET 80 and the input of an error amplifier 106. The secondary winding of the transformer 100 is connected between ground and the cathode of the laser diode 84. A capacitor 108, which is of greater capacitance than the capacitor 86, is connected between the primary and secondary windings of the transformer 100.

The error amplifier 106 comprises an operational amplifier 110 with its non-inverting input grounded, a resistor 112 connected between the output and the inverting input of the amplifier 110, a resistor 114 connected between the input of the error amplifier 106 and the inverting input of the amplifier 110, and a current source 116 connected between the inverting input of the amplifier 110 and a negative voltage source. The output of the error amplifier 106 is applied to the inverting input of the comparator 96 whose non-inverting input is connected to the resistor 94.

Simultaneously with the generation of an optical pulse in response to the negative edge of the pulse trigger signal, the double throw switch 92 is switched to resistor 94. When the switch 70 is closed, current builds up in the primary winding of the transformer 90. When the voltage across the resistor 94 passes the voltage at the inverting input of the comparator 96, the switch 92 is shut off by the output of the comparator 96. The energy stored in the transformer 90 is formed through its secondary winding, the diode 98 and transformer 100 to the capacitor 108. The capacitor 108 is charged up to the predetermined supply voltage for the MOSFET 80. When a pulse is applied to the gate of the MOSFET 80, the laser diode 84 emits infrared light and the capacitor 108 loses a little charge.

The error amplifier 106 compares the supply voltage to a reference supply voltage level provided by the current source 116. The output of the error amplifier is more positive with a lower supply voltage. This output is used by the comparator 96 as the comparison level to which the current in the transformer 90 is allowed to build.

When the switch 70 is open, supply voltage is not applied to the MOSFET 82 because the supply voltage generator 88 does not operate. Accordingly, the laser diode 84 operates only when an optical fiber is connected to the OTDR.

It will be appreciated that the invention is not restricted to the particular connector which has been shown and described, since variations may be made therein without departing from the scope of the invention as defined in the appended claims, and equivalents thereof. In particular, the invention is not restricted to use with an OTDR, since it is equally applicable to other instruments which provide harmful or dangerous optical outputs and use fiber optic connectors.

I claim:

1. An optical connector for establishing an optically coupled relationship between an electrically-energizable light source and an optical fiber, comprising first and second mating coupling members for receiving the light source and the optical fiber respectively and holding them in predetermined respective dispositions such that when the first and second members are coupled together the light source and the optical fiber are in optically coupled relationship, said first member having two electrically conductive terminal portions for connection to a driver circuit for the light source and said second member having an electrically conductive portion which contacts the two terminal portions when the first and second members are coupled together for establishing electrical connection between said terminal portions.

2. A connector according to claim 1, wherein said first member includes a receptacle and said second member includes a plug which is insertable into the receptacle.

3. A connector according to claim 2, wherein said terminal portions comprise respective pins projecting from the receptacle, and the conductive portion of the second member is a metal ring which is attached to the plug and which engages the pins when the plug is inserted into the receceptacle.

4. A connector according to claim 3, wherein the metal ring is adhered to an annular body of resilient material, the metal ring being attached to the plug by virtue of the plug being received in said annular body and being retained therein by deformation of the resilient material.

5. A connector according to claim 1, wherein said terminal portions comprise respective pins projecting from the first member, and the conductive portion of the second member is a metal ring which is attached to the second member and engages the pins when the first and second members are coupled together.

6. A connector according to claim 1, wherein said light source comprises a light emitting element and an optical fiber in optically coupled relationship therewith, the optical fiber of the light source being adapted to be received by said first coupling member.

7. A device for injecting light into an optical fiber which is provided at one end with a coupling member having an electrically conductive portion presented towards said one end of the fiber, the device comprising an electrically-energizable light source, an electrical driver circuit for energizing the light source, said electrical driver circuit including two terminals which, when connected together externally of the circuit, enable the circuit to operate and energize the light source but, when not connected together, inhibit operation of the circuit and energization of the light source, and a coupling member which can be mechanically mated with the coupling member attached to the optical fiber to place the light source into optically coupled relationship with the fiber, the coupling member having two conductive terminal portions connected respectively to said terminals of the driver circuit and which contact said conductive portion of the second coupling member when the first and second coupling members are coupled together, thereby permitting operation of the driver circuit.

8. A device according to claim 7, wherein the light source comprises an electrically-energizable light emitting element and a second optical fiber in optically coupled relationship with the light emitting element and in mechanically coupled relationship with the second coupling member, whereby the light emitting element is brought into optically coupled relationship with the first-mentioned optical fiber through the second optical fiber when said first and second members are coupled together.

9. In combination, a device for emitting optical energy and an optical fiber for transmitting the optical energy, said device comprising a light source and an electrical driver circuit for energizing the light source, the driver circuit having first and second terminals which, when connected together externally of the circuit, enable the driver circuit to operate and energize the light source but, when not so connected, inhibit operation of the driver circuit and energization of the light source, and said device further comprising a first coupling member in mechanically coupled relationship with said light source and having two terminal portions connected respectively to said terminals of the driver circuit, and said optical fiber being provided at one end with a second coupling member which is mechanically mateable with the first coupling member whereby the optical fiber can be brought into optically coupled relationship with the light source, and the second coupling member having a conductive portion which contacts the terminal portions of the first coupling member when the two coupling members are mechanically connected together, thereby establishing electrical connection between the terminals of the driver circuit.

10. A combination according to claim 9, wherein the light source comprises an electrically-energizable light emitting element and an optical fiber in optically coupled relationship therewith, the optical fiber of the light source being mechanically coupled to the first coupling member.

* * * * *